Patented June 29, 1943

2,322,914

UNITED STATES PATENT OFFICE 2,322,914

MANUFACTURE OF MONONITRILES OF DICARBOXYLIC ACIDS

Burnard S. Biggs, Summit, N. J., assignor to Bell Telephone Laboratories, Incorporated, New York, N. Y., a corporation of New York No Drawing. Application November 22, 1940, Serial No. 366,721

13 Claims. (Cl. 260—464)

This invention relates to the art of preparing mononitriles of dicarboxylic acids or, as they may be termed, cyano acids.

It has heretofore been proposed in Greenewalt et al. Patent 2,132,849 to prepare aliphatic dinitriles by heating in the liquid state in an atmosphere of ammonia a diamide or a diammonium salt of a dicarboxylic acid. Aside from certain undesirable amides, only the dinitrile is produced by this process.

The present invention has for one object, among others, the provision of processes for the preparation of the mononitriles of dicarboxylic acids which are simple, not critical as to reaction conditions, economical, and productive of large yields.

In the achievement of its objects the present invention provides a process for the preparation by pyrolysis of such a mononitrile from an amide, such as a diamide of a dicarboxylic acid, or from an ammonium salt, such as a diammonium salt of a dicarboxylic acid. The formation of the amide or other nitrogen-containing derivative of the dicarboxylic acid and its decomposition to the mononitrile of the acid may also be accomplished in a single operation according to the present invention.

According to the first-mentioned aspect of the present invention a diammonium salt or a diamide of a suitable dicarboxylic acid is heated until pyrolysis occurs as to the ammonium or amide groups, with the resultant formation of a mixture of reaction products, including the dinitrile of the dicarboxylic acid, a substantial amount of the mononitrile of said acid, and the acid itself, from which mixture the desired mononitrile of the acid may be readily separated.

The mononitriles of alkyl, aryl, aralkyl and other types of dicarboxylic organic acids may thus be prepared. Such mononitriles or cyano acids may have the cyano and carboxylic groups at the ends of the molecules or intermediate the ends thereof. The present invention, however, lends itself particularly well to the production of aliphatic cyano acids having the cyano and carboxyl groups at opposite ends of the aliphatic chain. It is, in any event, undesirable to employ a process embodying the present invention for the production of the mononitriles of dicarboxylic acids having their cyano and carboxylic groups separated by less than five atoms, preferably carbon atoms. Undesirable cyclic compounds are formed if it is attempted to produce mononitriles having a lesser number of atoms separating the cyano and carboxylic groups, with an attendant considerable reduction in the yield of the mononitrile.

Consequently the diammonium salt or diamide which is pyrolized according to the present invention should have its carboxyl groups separated by at least five atoms.

Heating of the diammonium salt or diamide may be performed in air, under pressure, or in a vacuum, the temperature to which it is heated ranging from 150° C. to 350° C., depending to a large extent upon the pressure employed. Preferably, the temperature to which the diammonium salt or diamide is heated should, for the pressure employed, be sufficient to permit distillation of the reaction products, and thus make their removal and collection simple. Removal of such products as they are formed not only makes it possible readily to collect the desired products but also promotes the reaction and renders possible production of larger yields of the mononitrile. The time required for the completion of the reaction will depend upon such factors as the temperature and pressure employed, the quantity of salt or amide employed, etc., but usually several hours are required. No excess ammonia is present, other than the ammonia which may be formed as a result of pyrolysis, since the presence of substantial quantities of ammonia will result in a reduction in the yield of the mononitrile and a corresponding increase in the production of the dinitrile.

Under conditions such as those indicated above, yields of the mononitrile of the dicarboxylic acid of as much as 50 per cent of the theoretical maximum are possible.

During pyrolysis of the diammonium salt most if not all of the salt is converted into the diamide, which is then decomposed into the above-indicated mixture of reaction products.

The mononitrile may be isolated from the dinitrile and the dicarboxylic acid with which it is mixed in the reaction product mixture by first forming an aqueous solution of soluble salts of the mononitrile and the dicarboxylic acid and separating the dinitrile, which is an oily insoluble liquid, from such solution. Thereafter the desired mononitrile may be separated from the dicarboxylic acid through differences in the solubilities of certain of their salts, such as the barium salts.

The diamide may, of course, be obtained from any suitable source. According to another aspect of the present invention, however, the diamide may be formed and decomposed to the mono-nitrile and other products in one operation. A dicarboxylic acid, preferably one having at least five atoms between the carboxylic groups for the reasons given above, is heated with a substance which provides ammonia when heated, such as urea, thiourea, ammonium cyanate, ammonium thiocyanate, ammonium carbonate, or ammonium carbamate. Preferably ammonia providing substances are employed which have two reactive groups capable of providing ammonia, since a lesser amount of such substance is required to form the diamide of the dicarboxylic acid and since the reaction is better promoted than if an ammonia providing substance having only one ammonia providing group is employed. The heating is conducted under conditions of a nature and at a temperature sufficient to form a substantial amount of the diamide and decompose it to the mononitrile. The reactants may be heated in air, or at an elevated pressure, or under a vacuum to a temperature lying between about 150° C. and about 350° C. depending largely on the pressure employed. Preferably the temperature should be high enough to permit distillation of the reaction products, which therefore may be removed in this manner as they are formed. Removal of the reaction products promotes the reaction and increases the yield.

No substantial excess of ammonia is added or is present. Indeed the amount of ammonia providing substance which is employed should not be much, if any, greater than that calculated to convert dicarboxylic acid to the diamide. If an excess is employed it preferably should not be greater than about 25 per cent more than the weight calculated to form the diamide. Otherwise a large excess of ammonia produced through heating of the ammonia producing substance will cause the formation of a larger proportion of the dinitrile at the expense of the yield of the desired mononitrile. On the other hand the amount of ammonia providing substance employed should not be substantially less than that calculated to produce the dinitrile, since under such circumstances the proportion of the dicarboxylic acid produced as the result of the reaction is increased at the expense of the yield of mononitrile. Within the above limits and under the conditions indicated above, yields of the desired mononitrile of as great as 50 per cent of the theoretical may be obtained.

The reaction products obtained by heating the ammonia providing substance with the dicarboxylic acid are contained in a mixture comprising the dinitrile of the dicarboxylic acid, the desired mononitrile, and the dicarboxylic acid itself. The desired mononitrile may be separated from the other reaction products in the manner as generally indicated above.

It is undesirable, if not impossible, to isolate by fractional distillation the mononitrile from the dinitrile of the dicarboxylic acid and the dicarboxylic acid with which it is mixed, since the isolated mononitrile, when heated, partly rearranges into a mixture comprising the mononitrile, the dinitrile and the dicarboxylic acid derived from the mononitrile. Hence, a method of isolating the mononitrile which does not involve the heating of the mononitrile should be employed, such as that indicated above, or else the mononitrile as rapidly as it is isolated will partially rearrange into the mixture of the dinitrile, mononitrile and dicarboxylic acid.

At elevated temperatures an equilibrium mixture of the dinitrile, mononitrile and dicarboxylic acid exists. The relative proportions of these constituents are not the same in all cases, but are dependent upon the amounts of the constituents originally present. For each set of conditions a different equilibrium is established. Establishment of such an equilibrium occurs during the production of the mononitrile by the pyrolysis procedures indicated above. Thus, if less mononitrile is produced by pyrolysis than is required to establish the equilibrium, the dinitrile and the dicarboxylic acid react to form more mononitrile until the equilibrium is established; if more mononitrile is produced by the pyrolysis reaction than is required to establish the equilibrium, it partially rearranges to form dinitrile and dicarboxylic acid and thus establishes equilibrium.

The mononitrile may also be prepared originally by heating together a dicarboxylic acid and the dinitrile of said acid. Under such conditions these substances react to form a mixture of the dinitrile, the dicarboxylic acid and the desired mononitrile, in which mixture these substances are in equilibrium. The amount of the mononitrile produced is, of course, dependent upon the proportions of the acid and the dinitrile originally present. The acid and the dinitrile may be heated in air, at a substantial pressure, or in a vacuum, to a temperature of from about 150° C. to about 350° C., depending largely upon the pressures employed. Several hours of heating are usually required.

The mononitrile may be separated from the other substances with which it is mixed by a procedure similar to that indicated above, according to which the substances are separated due to differences in solubilities of the substances or their salts.

The following examples are given for the purposes of illustration and are not to be considered as limitative, since various modifications may be made therein and other processes may be employed without departing from the spirit of the invention.

*Example 1*

According to this example 9-cyano-nonanoic acid was produced by destructive distillation of the diamide of sebacic acid. A suitable amount of the diamide was placed in a one-liter distilling flask having attached to its side arm as a receiver a second distilling flask, the side arm of which was connected to a water condenser to trap any material carried out by the vapors given off during the dehydration. The diamide was heated slowly in the first flask until it had all melted and then was heated as rapidly as the foaming thereof would permit. Steam and ammonia began to escape almost at once and the temperature of the vapor rose rapidly until oily distillate began to collect at about 305° C. Little water was eliminated after this stage of the reaction was passed, the distillates being composed almost entirely of oily products. The temperature rose to about 330° C., where it remained for most of the reaction and toward the end of the reaction reached 335° C. at which time the distillation was halted, a small residue being left in the flask.

The distillate contained a substantial amount of the desired mononitrile of sebacic acid, the dinitrile of sebacic acid, and sebacic acid itself. The dinitrile was removed by washing the total distillate with sodium carbonate solution, thus forming soluble sodium salts of both the sebacic acid and the mononitrile. The oily layer of the dinitrile, which was insoluble in water, was readily separted. The water solution containing the sodium salts of sebacic acid and the mononitrile of sebacic acid was brought to neutrality and an excess of barium chloride added. The solution was heated to boiling and filtered hot. Barium sebacate is quite insoluble in hot water contining excess barium ions, and hence it was left on the filter while the barium salt of the mononitrile, which is quite soluble in hot water, passed through the filter with the filtrate. The filtrate was acidified, as by hydrochloric acid, and chilled, the mononitrile of sebacic acid separating as an oil which solidified on further cooling and was then filtered from the water. Reliquefication in hot water, followed by resolidification and filtration, was done to remove organic impurities.

On the other hand the filtrate containing the barium salt of the mononitrile need not have been acidified but could have been cooled so that crystals of the barium salt of the mononitrile separated out. The crystals could then have been filtered from the filtrate, redissolved in water and acidified with hydrochloric acid. This solution on being cooled would have resulted in the formation of the oil and then the solid mononitrile of sebacic acid.

The total yield of the mononitrile was about 35 per cent of the calculated yield.

*Example 2*

A mixture of 890 grams of sebacic acid and 324 grams of urea (approximately 125 per cent of the weight of the urea necessary to convert the acid into the diamide) was heated to about 160° C. for four hours and then was distilled in the manner indicated above in two interconnected flasks. Considerable foaming took place at first and the first flask was heated only as fast as the foaming would allow. Water, ammonia, carbon dioxide, and some by-products of the urea passed out of the heated flask at first, and then the oily distillate was formed as in the above example. The distillate comprised a mixture of the dinitrile of sebacic acid, the desired mononitrile of sebacic acid, and sebacic acid itself. The desired mononitrile was separted from the other reaction products in the manner described in Example 1. A yield of about 35 per cent of the theoretical maximum yield of the mononitrile was obtained.

*Example 3*

A mixture of 101 grams of sebacic acid and 82 grams of the dinitrile of sebacic acid were heated in air to a temperature of about 275° C. for five hours. The reaction mass then comprised the mononitrile of sebacic acid, the dinitrile of sebacic acid and sebacic acid itself as well as a brownish residue. The desired mononitrile was separated from the other reaction products in the manner described in Example 1 by solubility differences. A yield of about 20 per cent of the theoretical maximum yield of the mononitrile was obtained.

The mononitrile of sebacic acid, which is an entirely new product, is a colorless solid at room temperatures and has a melting point in the neighborhood of 51.5° C. to 52° C. It has an apparent boiling point of 187° C. at 7 millimeters of mercury, but on being heated it undergoes partial rearrangement to the dinitrile and sebacic acid and hence fractional distillation cannot be used as a method of isolation of the mononitrile. It is insoluble in water.

The cyano acids produced according to the present invention may be employed in various manners. For example, by hydrogenation of the cyano group there may be produced the corresponding amino acid, which also has a wide range of uses. Such amino acids for example may be employed in the production of extremely useful high molecular weight linear polymers.

The method provided by the present invention is advantageous over prior methods for producing cyano acids in that it is simple, not critical, and provides relatively large yields. Moreover, the reaction products which are not converted into the desired mononitrile may be reused to produce more mononitrile, thus increasing the economy of the process. Moreover, the method of this invention does not involve the use of or handling of corrosive chemicals, such as phosphorous pentoxide or phosphorous oxychloride, in order to decompose ammonium salts or amide groups into cyano groups. Such substances are extremely difficult to handle, require the employment of expensive reaction vessels and are dangerous to operators.

It is apparent that various modifications may be made in the illustrated embodiments of the invention and that other modes of practicing the invention than the specific ones mentioned above may be employed without departing from the spirit of the invention.

It is intended that the patent shall cover, by suitable expression in the appended claims, whatever features of patentable novelty reside in the invention.

What is claimed is:

1. The process of forming the mononitrile of sebacic acid comprising heating alone sebacic acid with an amount of urea substantially that theoretically required to convert the sebacic acid into the diamide, distilling the reaction products, collecting the distillate containing the reaction products, washing the distillate with an aqueous solution of a compound of an alkali, separating said aqueous solution from the insoluble portion of the distillate, acidifying said insoluble solution and separating the resulting oily layer from the aqueous layer, dissolving said oily layer in a hot aqueous solution of a barium compound thereby precipitating the residual sebacic acid as barium sebacate, separating from the precipitated barium sebacate an aqueous solution of the barium salt of the mononitrile of sebacic acid, and acidifying an aqueous solution of said salt, thereby causing the separation of an oily layer of substantially pure mononitrile of sebacic acid.

2. The process of producing a mononitrile of a dicarboxylic acid comprising heating alone a diamide of a dicarboxylic acid having its carboxyl groups separated by at least five atoms at a temperature between about 150° C. and about 350° C. until said diamide decomposes into a mixture of reaction products including a substantial proportion of the mononitrile of said dicarboxylic acid, and separating said mononitrile from said mixture of reaction products without heating said mononitrile as such sufficiently to decompose it.

3. The process of producing a mononitrile of a dicarboxylic acid comprising heating as the sole active ingredient a diamide of a dicarboxylic acid having its carboxyl groups separated by at least five atoms at a temperature between about 150° C. and about 350° C. until said diamide decomposes into a mixture of reaction products including a substantial proportion of the mononitrile of said dicarboxylic acid, and separating said mononitrile from said mixture of reaction products without heating said mononitrile as such sufficiently to decompose it.

4. The process of producing the mononitrile of an aliphatic dicarboxylic acid comprising heating as the sole active ingredient a diamide of an aliphatic dicarboxylic acid having its carboxyl groups separated by at least five atoms at a temperature between about 150° C. and about 350° C. until said diamide decomposes into a mixture of reaction products including a substantial proportion of the mononitrile of said dicarboxylic acid, and separating said mononitrile from said mixture of reaction products without heating said mononitrile as such sufficiently to decompose it.

5. The process of producing a mononitrile of a dicarboxylic acid comprising heating alone a diamide of a dicarboxylic acid having its carboxyl groups separated by at least five atoms at a temperature between about 150° C. and about 350° C. until said diamide decomposes to a mixture of reaction products including a substantial proportion of the mononitrile of said dicarboxylic acid, and separating said mononitrile from said mixture of reaction products by solubility differences without heating said mononitrile as such sufficiently to decompose it.

6. The process of producing a mononitrile of an aliphatic dicarboxylic acid comprising heating alone a diamide of an aliphatic dicarboxylic acid having its carboxyl groups separated by at least five atoms at a temperature between about 150° C. and about 350° C. until said diamide decomposes into a mixture of reaction products including a substantial proportion of the mononitrile of said dicarboxylic acid, distilling said mixture of reaction products, and thereafter separating said mononitrile from said distilled mixture of reaction products by solubility differences without heating said mononitrile as such sufficiently to decompose it.

7. The process of producing a mononitrile of a dicarboxylic acid comprising heating as the sole active ingredient a diammonium salt of a dicarboxylic acid having its carboxyl groups separated by at least five atoms at a temperature between about 150° C. and about 350° C. until said diammonium salt decomposes into a mixture of reaction products including a substantial proportion of the mononitrile of said dicarboxylic acid, and separating said mononitrile from said mixture of reaction products without heating said mononitrile as such sufficiently to decompose it.

8. The process of producing a mononitrile of a dicarboxylic acid comprising heating alone a diammonium salt of a dicarboxylic acid having its carboxyl groups separated by at least five atoms at a temperature between about 150° C. and 350° C. until said diammonium salt decomposes into a mixture of reaction products including a substantial proportion of the mononitrile of said dicarboxylic acid, distilling said mixture of reaction products, and separating said mononitrile from said distilled mixture of reaction products without heating the mononitrile as such sufficiently to decompose it.

9. The process of producing a mononitrile of a dicarboxylic acid comprising heating alone a diammonium salt of an aliphatic dicarboxylic acid having its carboxyl groups separated by at least five atoms to a temperature between about 150° C. and about 350° C. until said diammonium salt decomposes into a mixture of reaction products including a substantial proportion of the mononitrile of said dicarboxylic acid, distilling said mixture of reaction products and separating said mononitrile from said distilled mixture of reaction products by solubility differences without heating said mononitrile as such sufficiently to decompose it.

10. The process of producing a mononitrile of a dicarboxylic acid comprising heating as the sole active ingredients a mixture of a dicarboxylic acid having its carboxyl groups separated by at least five atoms and an ammonia-providing substance present in an amount substantially that theoretically required to convert said dicarboxylic acid into the diamide, said heating being performed at a temperature between about 150° C. and about 350° C. until a mixture of reaction products including a substantial proportion of the mononitrile of said dicarboxylic acid is formed, and separating said mononitrile from said mixture of reaction products without heating said mononitrile as such sufficiently to decompose it.

11. The process of producing a mononitrile of a dicarboxylic acid comprising heating alone a mixture of a dicarboxylic acid having its carboxyl groups separated by at least five atoms and an ammonia-providing substance present in an amount substantially that theoretically required to convert said dicarboxylic acid into the diamide, said heating being performed at a temperature between about 150° C. and about 350° C. until a mixture of reaction products including a substantial proportion of the mononitrile of said dicarboxylic acid is formed, distilling said mixture of reaction products, and thereafter separating said mononitrile from said distilled mixture of reaction products without heating said mononitrile as such sufficiently to decompose it.

12. The process of producing a mononitrile of a dicarboxylic acid comprising heating alone a mixture of an aliphatic dicarboxylic acid having its carboxyl groups separated by at least five atoms and an ammonia-providing substance which is present in an amount substantially that theoretically required to convert said dicarboxylic acid into the diamide, said heating being performed at a temperature between about 150° C. and about 350° C., until a mixture of reaction products including a substantial proportion of the mononitrile of said dicarboxylic acid is formed, distilling said mixture of reaction products, and separating said mononitrile from said distilled mixture of reaction products by solubility differences without heating said mononitrile as such sufficiently to decompose it.

13. The process of producing a mononitrile of a dicarboxylic acid having its carboxyl groups separated by at least five carbon atoms comprising forming, at a temperature between about 150° C. and about 350° C. as the sole active ingredients, an equilibrium mixture of the mononitrile and the dinitrile of said dicarboxylic acid and said dicarboxylic acid itself, said mixture containing a substantial proportion of said mononitrile, and separating said mononitrile from said mixture by solubility differences without heating said mononitrile as such sufficiently to decompose it.

BURNARD S. BIGGS.